United States Patent
Mayer et al.

(10) Patent No.: US 10,576,691 B2
(45) Date of Patent: Mar. 3, 2020

(54) ANCHORING IN A LIGHTWEIGHT BUILDING ELEMENT

(71) Applicant: Woodwelding AG, Stansstad (CH)

(72) Inventors: Jörg Mayer, Niederlenz (CH); Joakim Kvist, Grenchen (CH)

(73) Assignee: WOODWELDING AG, Stansstad (CH)

( * ) Notice: Subject to any disclaimer, the term of this patent is extended or adjusted under 35 U.S.C. 154(b) by 157 days.

(21) Appl. No.: 15/565,538

(22) PCT Filed: Jun. 9, 2016

(86) PCT No.: PCT/EP2016/063209
§ 371 (c)(1),
(2) Date: Oct. 10, 2017

(87) PCT Pub. No.: WO2016/198545
PCT Pub. Date: Dec. 15, 2016

(65) Prior Publication Data
US 2018/0104905 A1   Apr. 19, 2018

(30) Foreign Application Priority Data
Jun. 11, 2015 (CH) .................................. 837/15

(51) Int. Cl.
*B32B 37/00* (2006.01)
*B29C 65/60* (2006.01)
(Continued)

(52) U.S. Cl.
CPC ............ *B29C 65/603* (2013.01); *B29C 65/08* (2013.01); *B29C 65/608* (2013.01);
(Continued)

(58) Field of Classification Search
USPC ........................................................ 156/73.1
See application file for complete search history.

(56) References Cited

U.S. PATENT DOCUMENTS

| | | | |
|---|---|---|---|
| 3,440,117 A | 4/1969 | Soloff et al. | |
| 3,754,310 A | 8/1973 | Shea | |

(Continued)

FOREIGN PATENT DOCUMENTS

| | | |
|---|---|---|
| DE | 43 17 621 | 6/1994 |
| EP | 0 537 824 | 4/1993 |

(Continued)

OTHER PUBLICATIONS

Grady, et al., "Thermoplastic Elastomers", The Science and Technology of Rubber, 2013, pp. 591-652, Chapter 13, Elsevier Inc.; discussed in the specification.

(Continued)

*Primary Examiner* — James D Sells
(74) *Attorney, Agent, or Firm* — Rankin, Hill & Clark LLP

(57) ABSTRACT

A method of anchoring a connector in a first object is provided, the connector having a thermoplastic material in a solid state. The method includes providing the first object and the connector, bringing the connector into contact with the first object from a distal side thereof, causing mechanical vibration energy to impinge on the first object from a proximal end face thereof, the proximal end face being opposite the distal side, while the object and the connector are pressed against each other, until a proximally facing end of connector is at least partially flowable forming a flow portion of the thermoplastic material, and causing the flow portion to flow into structures of the first object, and letting the flow portion re-solidify to cause a positive-fit connection between the first object and the connector.

46 Claims, 9 Drawing Sheets

(51) Int. Cl.
  *B29C 65/08* (2006.01)
  *B29C 65/64* (2006.01)
  *B29C 65/74* (2006.01)
  *B29C 65/00* (2006.01)
  *F16B 5/01* (2006.01)
  *F16B 5/08* (2006.01)
  *E04B 1/41* (2006.01)
  *B29L 31/10* (2006.01)
  *F16B 5/04* (2006.01)

(52) U.S. Cl.
  CPC ........ *B29C 65/645* (2013.01); *B29C 65/7437* (2013.01); *B29C 66/1122* (2013.01); *B29C 66/21* (2013.01); *B29C 66/30325* (2013.01); *B29C 66/30326* (2013.01); *B29C 66/472* (2013.01); *B29C 66/474* (2013.01); *B29C 66/524* (2013.01); *B29C 66/723* (2013.01); *B29C 66/727* (2013.01); *B29C 66/72525* (2013.01); *B29C 66/7392* (2013.01); *B29C 66/742* (2013.01); *B29C 66/8242* (2013.01); *B29C 66/8322* (2013.01); *B29C 66/9221* (2013.01); *B29C 66/9231* (2013.01); *B29C 66/9241* (2013.01); *B29C 66/92445* (2013.01); *B29C 66/92921* (2013.01); *B29C 66/951* (2013.01); *E04B 1/40* (2013.01); *F16B 5/01* (2013.01); *F16B 5/08* (2013.01); *B29C 2793/0045* (2013.01); *B29L 2031/10* (2013.01); *F16B 5/04* (2013.01)

(56) References Cited

U.S. PATENT DOCUMENTS

| | | |
|---|---|---|
| 2008/0047107 A1* | 2/2008 | Clinch .............. B29C 66/43421 16/404 |
| 2014/0044476 A1 | 2/2014 | Cove et al. |
| 2017/0015049 A1 | 1/2017 | Kittel |
| 2017/0043525 A1 | 2/2017 | Wiethoff et al. |

FOREIGN PATENT DOCUMENTS

| | | |
|---|---|---|
| EP | 1 614 525 | 1/2006 |
| WO | 93/12344 | 6/1993 |
| WO | 98/42988 | 10/1998 |
| WO | 00/79137 | 12/2000 |
| WO | 2008/080238 | 7/2008 |
| WO | 2014/075200 | 5/2014 |
| WO | 2015/135824 | 9/2015 |
| WO | 2015/162029 | 10/2015 |

OTHER PUBLICATIONS

International Preliminary Report on Patentability dated Dec. 12, 2017 (Dec. 12, 2017), Application No. PCT/EP2016/063209, 7 pages.

English translation of Chinese Office Action dated Jun. 4, 2019, Application No. 201680031901.4, 9 pages.

Switzerland Search Report dated Sep. 25, 2015, Application No. CH 8372015, 2 pages.

* cited by examiner

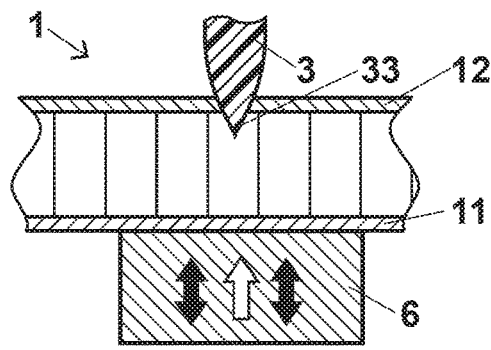
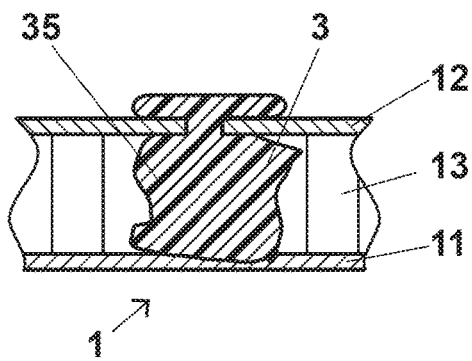
Fig. 11a  Fig. 11b
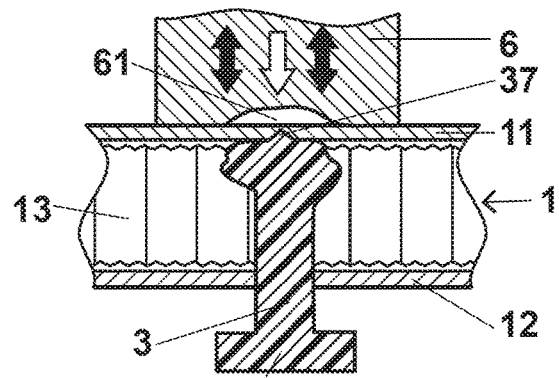
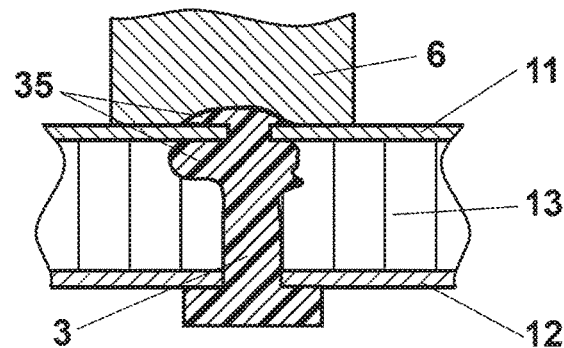
Fig. 12a  Fig. 12b
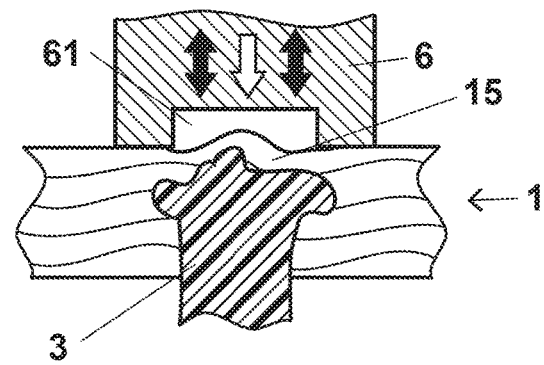
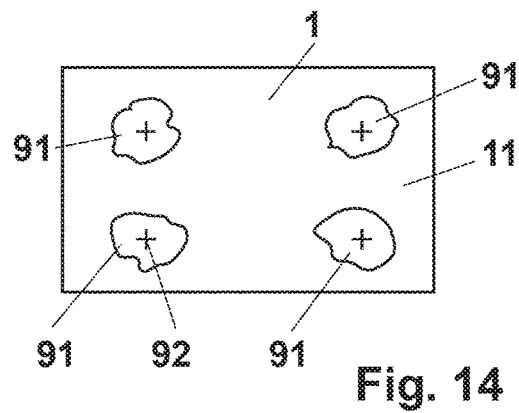
Fig. 13  Fig. 14

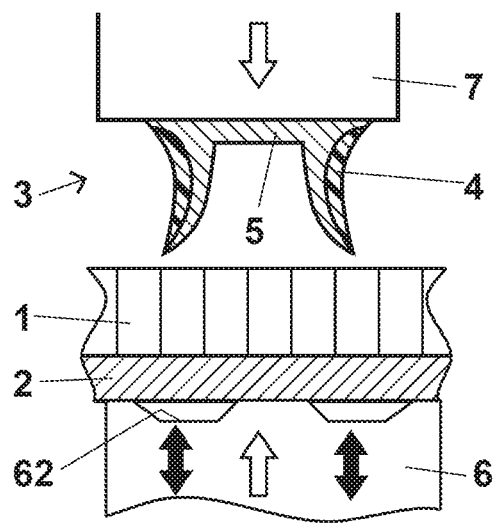
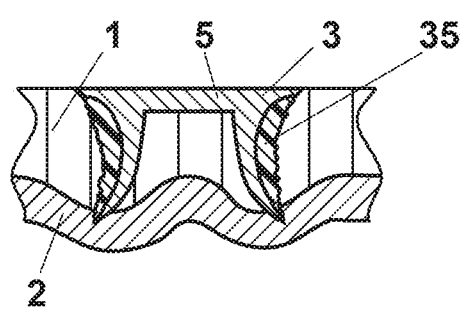
Fig. 15a
Fig. 15b
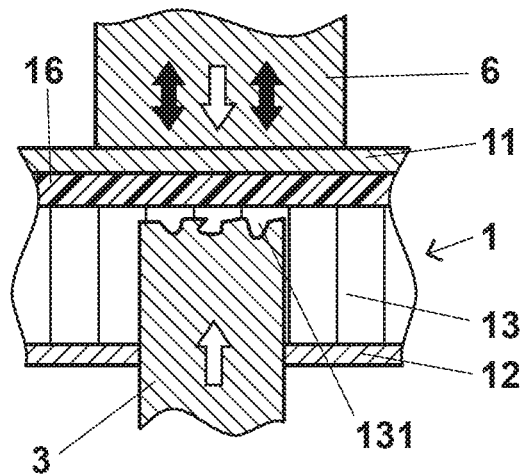
Fig. 16
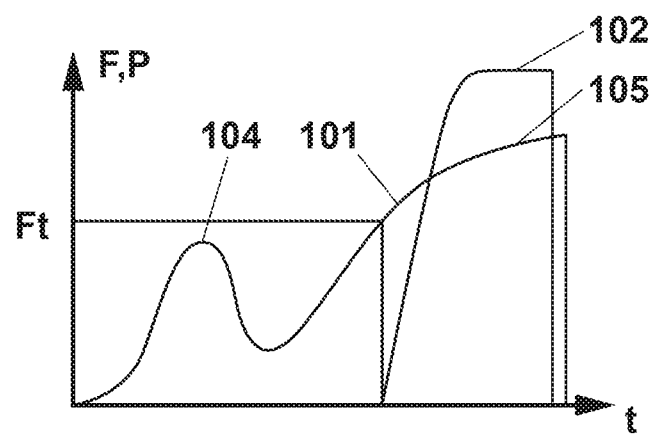
Fig. 17

ANCHORING IN A LIGHTWEIGHT BUILDING ELEMENT

BACKGROUND OF THE INVENTION

Field of the Invention

The invention is in the fields of mechanical engineering and construction, especially mechanical construction, for example automotive engineering, aircraft construction, shipbuilding, machine construction, toy construction etc. In particular, it relates to a method of anchoring a connector in a first object and of—mechanically—securing a second object to a first object.

Description of Related Art

In the automotive, aviation, furniture and other industries, there has been a tendency to move away from steel constructions and to use lightweight building components. An example of such elements are lightweight building elements that include two outer, comparably thin building layers, for example of a fiber composite, such as a glass fiber composite or carbon fiber composite, a sheet metal or also, depending on the industry, of a fiberboard, and a middle layer (interlining) arranged between the building layers, for example a cardboard honeycomb structure or a lightweight metallic foam. Lightweight building elements of this kind may be referred to as "sandwich boards" and are sometimes called "hollow core boards (HCB)". They are mechanically stable, may look pleasant and have a comparably low weight.

However, because the building layers are thin and the interlining is not suitable for anchoring a connector—such as a dowel—in it, it is difficult to attach an object to the lightweight building elements other than by an adhesive bond to the surface.

To meet these challenges, the automotive, aviation and other industries have started heavily using adhesive bonds. Adhesive bonds can be light and strong but suffer from the disadvantage that there is no possibility to long-term control the reliability, since a degrading adhesive bond, for example due to an embrittling adhesive, is almost impossible to detect without entirely releasing the bond. Also, adhesive bonds may lead to a rise in manufacturing cost, both, because of material cost and because of delays caused in manufacturing processes due to slow hardening processes, especially if the surfaces to be connected to each other have certain roughness and as a consequence the quickly hardening thin-layer adhesives cannot be used.

SUMMARY OF THE INVENTION

It is an object of the present invention to provide a method of anchoring a connector in a first object, especially in a sandwich board. It is a further object to provide a method of securing a second object to a first object. The method should overcome disadvantages of prior art methods.

According to an aspect of the present invention, a method of anchoring a connector in a first object is provided, the connector including a thermoplastic material in a solid state, the method comprising:
  providing the first object and the connector;
  bringing the connector into contact with the first object from a distal side thereof;
  causing mechanical vibration energy to impinge on the first object from a proximal end face thereof, the proximal end face being opposite the distal side, while the object and the connector are pressed against each other, until a proximally facing end of connector is at least partially flowable forming a flow portion of the thermoplastic material, and causing the flow portion to flow into structures of the first object; and
  letting the flow portion re-solidify to cause a positive-fit connection between the first object and the connector.

In this, the proximal end face of the first object may remain intact, i.e. the connector does not have to reach to the proximal end face of the first object.

Alternatively, the proximal end face may be provided with an opening in the proximal end face, which opening is made during the process or may be pre-made, and portions of the flow portion may be caused to flow through the opening. Optionally, the sonotrode may then include a shaping feature for shaping a head portion from these thermoplastic material portions that have flown through the opening.

In addition or as an alternative, the method may include causing a marking of the location (lateral (x-y-) position) where the connector is anchored on the distal side. Such marking may be a color marking, or a structural marking, such as a bulge. The markings may for example be obtained by the process itself, for example by causing a slight deformation (for example bulge) of the proximal surface caused by the appropriately shaped sonotrode.

The structures of the first object may be structures, especially pores, of a penetrable material.

A penetrable material suitable for this is solid at least under the conditions of the method according to the invention. It further includes (actual or potential) spaces into which the liquefied material can flow or be pressed for the anchoring. It is e.g. fibrous or porous or includes penetrable surface structures which are, e.g., manufactured by suitable machining or by coating (actual spaces for penetration). Alternatively, the penetrable material is capable of developing such spaces under the hydrostatic pressure of the liquefied thermoplastic material, which means that it may not be penetrable or only to a very small degree when under ambient conditions. This property (having potential spaces for penetration) implies, e.g., inhomogeneity in terms of mechanical resistance. An example of a material that has this property is a porous material whose pores are filled with a material that can be forced out of the pores, is a composite of a soft material and a hard material or a heterogeneous material in which the interfacial adhesion between the constituents is smaller than the force exerted by the penetrating liquefied material. Thus, in general, the penetrable material includes an inhomogeneity in terms of structure ("empty" spaces such as pores, cavities etc.) or in terms of material composition (displaceable material or separable materials).

In the example of a sandwich board with glass fiber composite building layers and an interlining between them, the penetrable material may for example be constituted by a foaming adhesive, such as a PU adhesive, between the building layers and the interlining, and/or by the interlining that itself may include spaces/pores.

In embodiments, the method includes the step of deforming and/or displacing material of the first object.
  Especially, such deforming and/or displacing material of the first object may be caused before portions of the connector are flowable.
  Especially, such deforming and/or displacing material may be caused directly by the connector, i.e. for example the connector when being pressed into the first object displaces and/or deforms material of the first object.
  Especially, in the step of causing the mechanical vibration to act until a portion of the connector is at least partially flowable, the structures into which the flow portion flows may include structures of deformed and/or displaced portions of the first object. For example, the deformed and/or displaced portions may constitute a region of enhanced density compared to the state prior to deforming and/or displacing, wherein the flow portion flows into structures of this region of enhanced density.

Thus, the step of deforming and/or displacing may include compressing material of the first object and anchoring the connector in the compressed material and/or in a vicinity thereof, for example proximally thereof and/or laterally thereof.

These optional features may be realized independently or in combination with each other or in sub-combinations.

In embodiments, the deformed and/or displaced portions include material of the interlining if the first object is a sandwich board of the above-described kind. Alternatively, the deformed and/or displaced portions may include a compressible foam (also if such foam constitutes an interlining of a sandwich board.)

In many embodiments, the connector during the process and possibly also thereafter remains accessible from the distal side. Especially, in embodiments it may be pressed towards the proximal side (from which the vibrations act) by a tool that is in physical contact with the connector and that is removed after the process.

In addition or as an alternative, in contrast for example to the teaching of EP1614525 that relates to a hidden dowel the method may include leaving a distal portion of the connector intact, i.e. no liquefaction of material is caused at the distal end (that may be pressed into the first object by an appropriate pressing tool).

In this text, generally the term 'connector' refers to a connector in a broad sense of the word, including a mechanical connector for mechanically connecting an other object or a connecting portion, i.e. the connector may be one-piece with the object to be connected or constituting the object to be connected. Also, the connector may directly carry or have integrated such second object (for example if the second object is smaller than the connector itself, for example if the second object is a sensor, a cable, etc.

In a group of embodiments, the method includes the further step of securing a second object to the first object by means of the connector. For example:

- The connector may include a foot portion, and the second object is clamped between a distally facing surface portion of the first object and the foot portion.
- The connector may include an attachment structure, such as a thread, a structure for a bayonet connection, a clip-on structure, an attachments surface for gluing a second object thereto, etc.
- The second object may be assembled to the first object after anchoring of the connector from the proximal side, for example through the essentially intact proximally facing surface, as explained in more detail hereinafter.
- In addition or as an alternative, the connector may have a function similar to a rivet in that it is deformed proximally of the proximal end face of the first object. Especially, in this the second object may be positioned proximally of the first object to be secured to the first object by the connector. In a sub-group of embodiments of this group, the connector may serve as a kind of punch rivet, in that it punches out a portion of the first object. In addition or as an alternative, the connector may be driven into material of the second object to be secured thereto by being embedded in this material of the second object.

The first object may have a generally flattish section (and may for example generally be flattish/board shaped) with two opposed broad surfaces and narrow side faces, the distal and proximal sides corresponding to the broad surfaces.

The first object may be a sandwich board, i.e. a building element that includes two outer, comparably thin building layers, for example of a fiber composite, such as a glass fiber composite or carbon fiber composite, of a sheet metal or also, of a fiberboard, and an interlining arranged between the building layers, for example a cardboard honeycomb structure or a lightweight metallic foam or a polymer foam or ceramic foam, etc., or a structure of discrete distance holders.

In this, during the step of causing mechanical vibration energy to impinge on the first object from a proximal end face thereof while the object and the connector are pressed against each other, the connector for example goes through the second, distal building layer and the interlining and abuts against an inner surface of the first, proximal building layer against which a tool subject to the mechanical vibrations is pressed.

More in general, the first object may include an opening accessible from the distal side, wherein the step of bringing the first and second objects into contact with each other includes introducing a proximally facing portion of the second object into the opening. If the first object is a sandwich board, the opening reaches at least through the distal building layer.

As an alternative to the first object including an opening accessible from the distal side, such an opening may be made by pressing the connector into the distally facing surface of the first object. To this end, the connector may include an appropriate piercing or cutting shape, such as a tip or edge.

As mentioned above, in a group of embodiments, the method may include securing a second object to the first object by means of the connector.

In this, the connector may be attached to a second object, prior to the step of causing mechanical vibration energy to impinge on the first object, during/by this step, and/or thereafter. In embodiments, to this end the connector includes a distal foot portion that is connected or connectable to the second object in a positive-fit like manner.

Especially, in embodiments, a method of securing a second object to a first object may include using a connector with a foot portion, especially a pre-formed foot portion, and clamping, by the anchoring process, a sheet portion of the second object between a proximally facing abutment face of the foot portion and a distally facing end face of the first object to secure the second object to the first object.

Thus, the second object (if any) may include a sheet portion that after anchoring lies against a distal attachment face of the first object. More in concrete, such a sheet portion may, after the anchoring, be clamped between the attachment face and a proximally facing abutment face of a foot portion of the connector, in a region near the opening in the distal side of the first object, into which the connector protrudes.

In embodiments, a second object includes a profile, such as a metal profile. If applicable, the metal profile may hold the foot.

Especially, the second object may include a support portion distally of the connector (if applicable its foot portion) or distally of a feature of the connector, so that a counter force to the force by which the object is pressed against the connector, may be applied to the second object.

In embodiments that include securing a second object to the first object by attaching such second object to the connector after the step of causing mechanical vibration energy to impinge on the first object, securing the second object may be made from the proximal side, with the proximally facing surface portion of the first object being optionally intact (i.e. not disrupted by the connector). In these embodiments, the connector serves as a kind of reinforcer of the first object, wherein the second object (for example a fastener, such as a screw, dowel, pin, etc.) is anchored in material of the connector, wherein the material of the first object would not have a sufficient strength without the connector reinforcement, for example if otherwise the material of the first object would be too weak and/or not dense enough for this second object to be anchored therein with sufficient anchoring strength.

As mentioned previously, the method may optionally include adding a marking on the proximal surface at locations where the connector is anchored. Such markings may be used for these embodiments to anchor the second objects also in a later step.

In these embodiments including anchoring a second object from the proximal side and also generally, in any of the described configurations, the method may include anchoring a plurality of connectors in a regular or irregular, defined arrangement.

The method may include carrying out the steps of bringing the connector into contact with the first object and of causing mechanical vibration energy to impinge on the first object while the object and the connector are pressed against each other for a plurality of connectors that are all anchored in the same first object simultaneously, for example using a single sonotrode. In this, the plurality of connectors may be held by a common second object at least during the step of causing mechanical vibration energy to impinge on the first object while the object and the connector are pressed against each other.

According to a second aspect of the invention, a method of anchoring a connector in a first object is provided, the first object including a thermoplastic material in a solid state, the method comprising:
  providing the first object and the connector;
  bringing the connector into contact with the first object from a distal side thereof;
  causing mechanical vibration energy to impinge on the first object from a proximal end face thereof, the proximal end face being opposite the distal side, while the object and the connector are pressed against each other, until a portion of the first object that is in contact with a proximally facing end of connector is at least partially flowable forming a flow portion of the thermoplastic material, and causing the flow portion to flow into structures of the connector; and
  letting the flow portion re-solidify to cause a positive-fit connection between the first object and the connector.

In other words, the second aspect of the invention includes inverting the process in that the liquefiable thermoplastic material belongs to the first object and the structures into which the flow portion thereof penetrates to yield, after re-solidification, a positive-fit connection belong to the connector. Otherwise, same optional features may apply as the above-discussed optional features of the first aspect, for example a piercing step to pierce a second building layer if the first object includes a sandwich board, fastening a second object by any one of the approaches described hereinbefore, deforming and/or displacing material of the first object prior to the anchoring, causing the connector to remain accessible, etc.

The following may pertain to either aspect of the invention:

In contrast to prior art ultrasonic welding or the "Woodwelding" process, no movement of the sonotrode relative to the first object is necessary during the process. Rather, a forward movement driving the connector relative to the first object may be caused by a pressing tool acting on the connector, whereas the sonototrode essentially remains stationary. The invention also concerns an apparatus, especially for carrying out the method described and claimed in this text. More in particular, such an apparatus may comprise:
  a vibration generating device coupled to a sonotrode for generating the mechanical vibration;
  a driving mechanism coupled to a tool for moving the connector relative to the sonotrode; and
  a control unit coupled to the vibration generating device and the driving mechanism and equipped to control a movement of the driving mechanism and a vibration generation of the vibration generating device.
The control unit is a unit in the functional sense and does not have to be a unit in the physical sense, i.e. different elements constituting the control unit may be physically separate from each other and for example belong to different parts/different entities, which different entities optionally may include further elements and serve further functions.

The apparatus may further include first sensing means for sensing directly or indirectly a position of the tool and/or the connector and/or a second sensing means for sensing directly or indirectly a force exerted by the tool on the connector.

The vibration generating device in this, in contrast to prior art apparatuses, for example for ultrasonic welding, may optionally be stationary, for example by being mounted in a stationary manner relative to a working frame (such as a working table) that defines the position of the first object during the process.

If the apparatus includes the first sensing means, this first sensing means may measure the position directly, for example optically, capacitively, etc., or indirectly by measuring the movement of the tool. In the latter case, the movement measurement may optionally be based on a feedback and/or control signal of the driving mechanism.

If the apparatus includes the second sensing means, this second sensing means may measure the force and/or the pressure exerted on the tool/by the tool. The second sensing means may include a dedicated sensing probe, for example a piezoelectric transducer in series with the tool and the driving mechanism, or may include using a feedback and/or control signal of the driving mechanism.

In these and other situations, the first sensing means and/or the second sensing means may optionally be integrated in the control unit, i.e. the sensing means may be sensing means in the functional sense of the word, and they do not have to be physically separate entities.

In either case, the sensing means senses the position and/or force on the tool, which is separate from the vibration generating apparatus, and during the process is subject to a movement towards the sonotrode (towards a proximal direction). Thus, in contrast to prior art approaches neither the force and/or position of the sonotrode may be used as parameter for controlling the vibration of the sonotrode but the force and/or position of the tool, i.e. the counter element.

Prior art vibration generating apparatus rely on the feedback signal of the vibration generating apparatus for controlling the vibration. In accordance with embodiments of the present invention, such feedback signal may be used as secondary control parameter also (for example, for controlling the vibration frequency) but especially relies on the named parameter of the tool, for example for determining the on/off state of the vibration generation and possibly also the vibration power and/or amplitude.

This approach of using a parameter/parameters of the tool and not primarily of the sonotrode as the control parameter(s) allows supporting the first object during the process not only by the sonotrode to but also by a separate support. The force distribution between the force absorbed by the sonotrode and the force absorbed by the separate support then does not need to be known.

The apparatus may, for example, be equipped and programmed to control the vibration generation according to one of the following criteria:

- A trigger force (on the tool) is defined. As soon as the force exceeds a trigger force, the vibrations set in. This first option is for example suited if, during the process, the connector has to penetrate through a region of the first object (for example, the interlining and possibly a second building layer if the first object is a sandwich board) and during this penetration the connector needs to remain in a solid state. The trigger force will be reached as soon as the connector is sufficiently close to the portion of the first object (such as the first building layer) that is directly supported by the sonotrode.
- As in the above option, a trigger force is defined. However, a condition for the vibrations to set in is that both, the trigger force is reached and the position of the connector is in a certain window. This second option is suitable for sandwich board first objects in set-ups in which the connector first has to mechanically penetrate the second building layer and during this penetration the force exerted on the connector is generally above the trigger force—and if during this penetration it is not desired that mechanical vibration energy is absorbed by the system (for example, because it would lead to undesired heat generation by the connector and/or by portions of the first layer).
- According to a third option, a condition for the vibrations to set in is that the position of the tool/the connector is in a defined window.
- Other options or combinations (for example if the apparatus is programmed to apply different options for different kinds of connectors or based on settings chosen by the user) are possible also.
- In either case, the apparatus may be programmed for the vibration power to remain constant while the vibrations act or for the vibration power to follow a certain profile.

The force-vs.-time behavior and the vibration power-vs.-time behavior will generally be synchronized.

In either case, the apparatus may be programmed to maintain a certain pressing force on the tool/connector after the vibrations are switched off for some time (holding phase), i.e. until the thermoplastic material has sufficiently re-solidified. In some embodiments, this maintained pressing force (holding force) is even increased after the switching off of the mechanical vibration to further deform the liquefied/softened proximal end (for example forming a head portion) of the thermoplastic material without additionally loading the material with mechanical vibration energy. Thereby, the "footprint" can be additionally made higher, i.e. the lateral extension of the flow portion after re-solidification may be enhanced.

In a group of embodiments, the apparatus is such that the force applied by the tool is a downward pointing force, and the outcoupling face of the sonotrode against which the proximal face of the first object rests during the process faces upward (with respect to the direction of gravity), i.e. the sonotrode acts upwards.

In a group of embodiments, the apparatus includes an abutment surface, against which the first object will be placed for carrying out the process, with at least one sonotrode integrated in the abutment surface, i.e. the outcoupling face of the sonotrode is approximately flush with the abutment surface (in this, of course, during the process the sonotrode will vibrate and will periodically protrude from the surface by at least about a vibration amplitude so as to couple the vibration into the first object).

In examples of this, the abutment surface forms a working bench (working plate/working table) on which the first object may be placed, with the at least one sonotrode integrated in the working bench.

The apparatus may in embodiments of this group in addition or as an alternative to the abutment surface being a working bench (so that gravity causes the first object to be pressed against the abutment surface) include other means that press the first object against the abutment surface, for example a clamp, suction channels in the abutment surface, a pneumatic press and/or any other suitable means.

The apparatus may in embodiments include a plurality of sonotrodes arranged at defined positions, for example, if applicable, relative to an abutment surface.

The following may apply:

The connector includes thermoplastic material. In embodiments, the connector consists of thermoplastic material.

In other embodiments, the connector in addition to the thermoplastic material includes a body of a not liquefiable material.

Generally, the connector may be essentially pin shaped or bolt shaped (i.e. have a shaft portion), with the mentioned optional head or foot portion and/or a possible additional step or taper. Then, an axis of the connector is caused to extend approximately perpendicularly to the sheet portion and attachment face. However, the connector does not necessarily have a round cross section. Rather, it may have a different shape, for example elongate, polygonal, T-shaped. H-shaped, U-shaped, etc.

The energy applied is mechanical vibration energy. The liquefaction of the flow portion in this is primarily caused by friction between the vibrating second object and the surface of the first object, which friction heats the first object superficially.

In a group of embodiments, the connector and/or a portion of the second and/or first object against which the connector is pressed comprises, at the surface that during the pressing and vibrating is in direct contact with the first object, structures serving as energy directors, such as edges or tips, such as energy directors known from ultrasonic welding or for the "Woodwelding" process as for example described in WO 98/42988 or WO 00/79137 or WO 2008/080 238.

The first and (if applicable) second objects are construction components (construction elements) in a broad sense of the word, i.e. elements that are used in any field of mechanical engineering and construction, for example automotive engineering, aircraft construction, shipbuilding, building construction, machine construction, toy construction etc. Generally, the first object and the connector and (if applicable) the second object will all be artificial, man-made objects. The use of natural material such as wood-based material in the first and/or second object is thereby not excluded. Especially, the second object may be a 'stringer' or other reinforcement mechanically reinforcing the first object (or vice versa).

The flow portion of the thermoplastic material is the portion of the thermoplastic material that during the process and due to the effect of the mechanical vibrations is caused to be liquefied and to flow. The flow portion does not have to be one-piece but may include parts separate from each other, for example at the proximal end of the connector and at a more distal place.

In this text the expression "thermoplastic material being capable of being made flowable e.g. by mechanical vibration" or in short "liquefiable thermoplastic material" or "liquefiable material" or "thermoplastic" is used for describing a material including at least one thermoplastic component, which material becomes liquid (flowable) when heated, in particular when heated through friction i.e. when arranged at one of a pair of surfaces (contact faces) being in contact with each other and vibrationally moved relative to each other, wherein the frequency of the vibration has the properties discussed hereinbefore. In some situations, for example if the first object itself has to carry substantial loads, it may be advantageous if the material has an elasticity coefficient of more than 0.5 GPa. In other embodiments, the elasticity coefficient may be below this value, since the vibration conducting properties of the connector thermoplastic material do not play a role in many embodiments of the process.

The fact that the vibration is coupled into the first object and not directly into the (thermoplastic) material of the connector and therefore the thermoplastic material do not play a role may even constitute a special advantage of embodiments of the invention. In particular, the approach makes possible that materials having a very low modulus of elasticity (elasticity coefficient) may be used. The approach according to the invention thus makes possible to connect such low modulus materials with the first object (for example a sandwich board), for example elastomeric thermoplastics.

Thermoplastic materials are well-known in the automotive and aviation industry. For the purpose of the method according to the present invention, especially thermoplastic materials known for applications in these industries may be used.

A thermoplastic material suitable for the method according to the invention is solid at room temperature (or at a temperature at which the method is carried out). It preferably includes a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally include a polymeric component that is not cross-linked covalently or cross-linked in a manner that the cross-linking bonds open reversibly upon heating to or above a melting temperature range. The polymer material may further include a filler, e.g. fibres or particles of material which has no thermoplastic properties or has thermoplastic properties including a melting temperature range which is considerably higher than the melting temperature range of the basic polymer.

In this text, generally a "non-liquefiable" material is a material that does not liquefy at temperatures reached during the process, thus especially at temperatures at which the thermoplastic material of the connector is liquefied. This does not exclude the possibility that the non-liquefiable material would be capable of liquefying at temperatures that are not reached during the process, generally far (for example by at least 80° C.) above a liquefaction temperature of the thermoplastic material or thermoplastic materials liquefied during the process. The liquefaction temperature is the melting temperature for crystalline polymers. For amorphous thermoplastics the liquefaction temperature (also called "melting temperature in this text") is a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa*s (in embodiments, especially with polymers substantially without fiber reinforcement, to below $10^3$ Pa*s)), of the thermoplastic material.

Specific embodiments of thermoplastic materials are: Polyetherketone (PEEK), polyesters, such as polybutylene terephthalate (PBT) or Polyethylenterephthalat (PET), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride, polyethylene, polypropylene, and polystyrene, or copolymers or mixtures of these.

Possible embodiments of thermoplastic materials further include thermoplastic elastomers. An overview of thermoplastic elastomers can be found in B. Grady et al., "Thermoplastic Elastomers"; chapter 13 of "The Science and Technology of Rubber", Fourth Edition 2013, Edited by James E. Mark, Burak Erman and Mike Roland, Elsevier 2013. Specific suitable thermoplastic elastomers are especially the ones discussed in chapter 13.1 and thermoplastic elastomers with the structure represented in FIG. 13.2 of this article.

In addition to the thermoplastic polymer, the thermoplastic material may also include a suitable filler, for example reinforcing fibers, such as glass and/or carbon fibers. The fibers may be short fibers. Long fibers or continuous fibers may be used especially for portions of the first and/or of the second object that are not liquefied during the process.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

Mechanical vibration or oscillation suitable for embodiments of the method according to the invention has preferably a frequency between 2 and 200 kHz (even more preferably between 10 and 100 kHz, or between 20 and 40 kHz) and a vibration energy of 0.2 to 20 W per square millimeter of active surface. The vibrating tool (e.g. sonotrode) is e.g. designed such that its contact face oscillates predominantly in the direction of the tool axis (longitudinal vibration) and with an amplitude of between 1 and 100 µm, preferably around 30 to 60 µm. Such preferred vibrations are e.g. produced by ultrasonic devices as e.g. known from ultrasonic welding.

In this text, the terms "proximal" and "distal" are used to refer to directions and locations, namely "proximal" is the side of the bond from which an operator or machine applies the mechanical vibrations, whereas distal is the opposite side. A broadening of the connector on the proximal side in this text is called "head portion", whereas a broadening at the distal side is the "foot portion".

BRIEF DESCRIPTION OF THE DRAWINGS

In the following, ways to carry out the invention and embodiments are described referring to drawings. The drawings, with the possible exception of photographs, are schematic in nature. In the drawings, same reference numerals refer to same or analogous elements. The drawings show:

FIGS. 11a and 11b stages of the method if the first object has an interlining with a very low density or has no interlining;

FIGS. 12a and 12b an embodiment in which the proximal surface of the first object is not left intact but is provided with a small opening;

FIG. 13 a configuration that includes adding a marking on the proximal side;

FIG. 14 a first object with a pattern of anchored connectors;

FIGS. 15a and 15b stages of the method in an embodiment in which the connector serves as a punch rivet and is anchored relative to a second object by being driven into material of this;

FIG. 16 an illustration of the principle of the second aspect;

FIGS. 17 and 18 examples of a process diagram;

DETAILED DESCRIPTION OF THE INVENTION

Figure 1A:
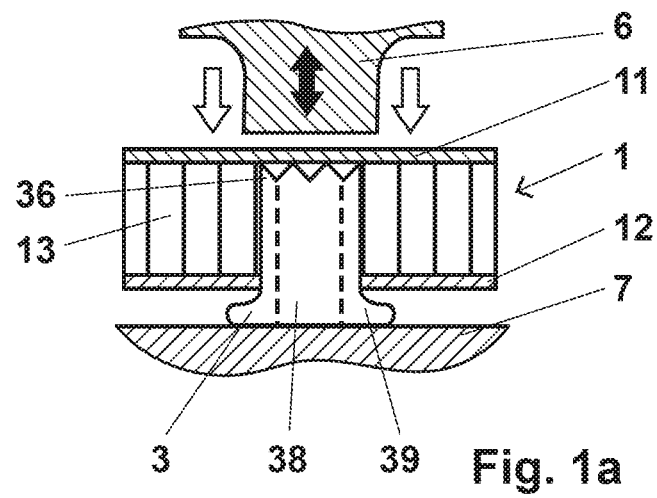
FIGS. 1a-1b stages of an anchoring process according to an embodiment of the invention.

The configuration of FIG. 1a includes a first object 1 being a sandwich board with a first building layer 11, a second building layer 12, and an interlining 13 between the building layers. The first and second building layers may include a fiber composite, such as a continuous glass or continuous carbon fiber reinforced resin. The interlining may be any suitable lightweight material, for example a honeycomb structure of cardboard. An additional adhesive may bond the building layers 11, 12 to the interlining. In an example a slightly foaming adhesive on polyurethane basis is used. Possible pores in the adhesive may contribute to the anchoring in the various embodiments of the invention.

The first object includes an opening that extends from the distal end face inwards and especially goes through the second building layer 12.

The connector 3 consists of a thermoplastic material and has a foot portion 39 and a shaft portion extending proximally from the foot portion 39 and through the opening. The shaft portion in the depicted embodiment is essentially tube-shaped with an axially running hollow space 38. At the proximal end, energy directors 36 are arranged.

The length of the shaft portion of the connector (its proximodistal extension in the depicted configuration) is greater than a cumulated thickness of the second building layer 12 and the interlining 13 so that when it abuts against the inner face of the first building layer 11 it still protrudes from the mouth of the opening.

A sonotrode 6 is used to couple mechanical vibration and a pressing force into the first object from a proximal end face thereof while the object and the connector are pressed against each other by the sonotrode 6 and a non-vibrating support 7 against which a distal end of the connector is pressed.

Figure 1B:
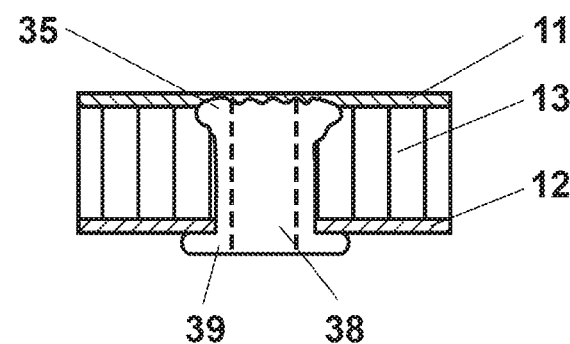

The joint effect of the vibration and the pressing force is that a flow portion 35 of the thermoplastic material becomes flowable and is pressed into structures around the connector 3. Thereby, dimensions of the connector change. After the re-solidification a positive-fit connection results. The resulting configuration is illustrated in FIG. 1b that illustrates how the foot portion rests against a distally facing face of the second building layer 12 and the flow portion 35 interpenetrates structures of the first object 1 and thereby also forms a kind of a head. Instead of resting directly against the second building layer 12, the foot portion 39 could also rest against a sheet portion of a second object to be secured to the first object, for example any second object of a kind as illustrated hereinafter.

The connector 3 shown in FIGS. 1a and 1b can in addition or as an alternative be used to fasten an other item to it, for example by screwing such other item into the hollow space or otherwise securing it thereto. To this end, the connector may include a further element, such as a metal socket (not shown) embedded in the thermoplastic material.

Figure 2:
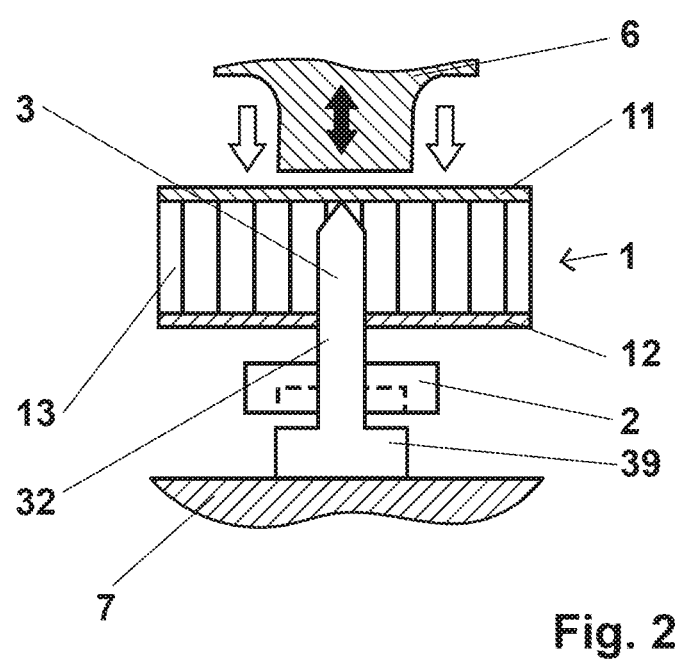
FIG. 2 an alternative configuration for an anchoring process, the configuration including a metal element as second object.

FIG. 2 shows a configuration that is distinct from the configuration of FIG. 1a by the following features:

The connector has a shaft portion that is not tube shaped but pin shaped,

The connector has a proximally facing tip (or other self-penetrating structure) that may, for example, also serve for manufacturing the opening in the second building layer 12 through which the connector is inserted. Such manufacturing step may be done in a continuous process followed by the step of making the flow portion flowable, and it may be done without or with input of mechanical vibration energy.

A second object 2 is secured to the first object 1 by the connector in that it is clamped between the foot portion 39 and the second building layer 12, with the shaft portion 32 extending through a corresponding opening (bore or slit or similar) of the second object. The second object is illustrated to have an optional distal indentation the dimensions of which are adapted to the dimensions of the foot portion 39 to accommodate the foot portion so that the foot portion is, at least to some extent, countersunk in the second object.

These features are realizable independent of each other.

Figure 3:
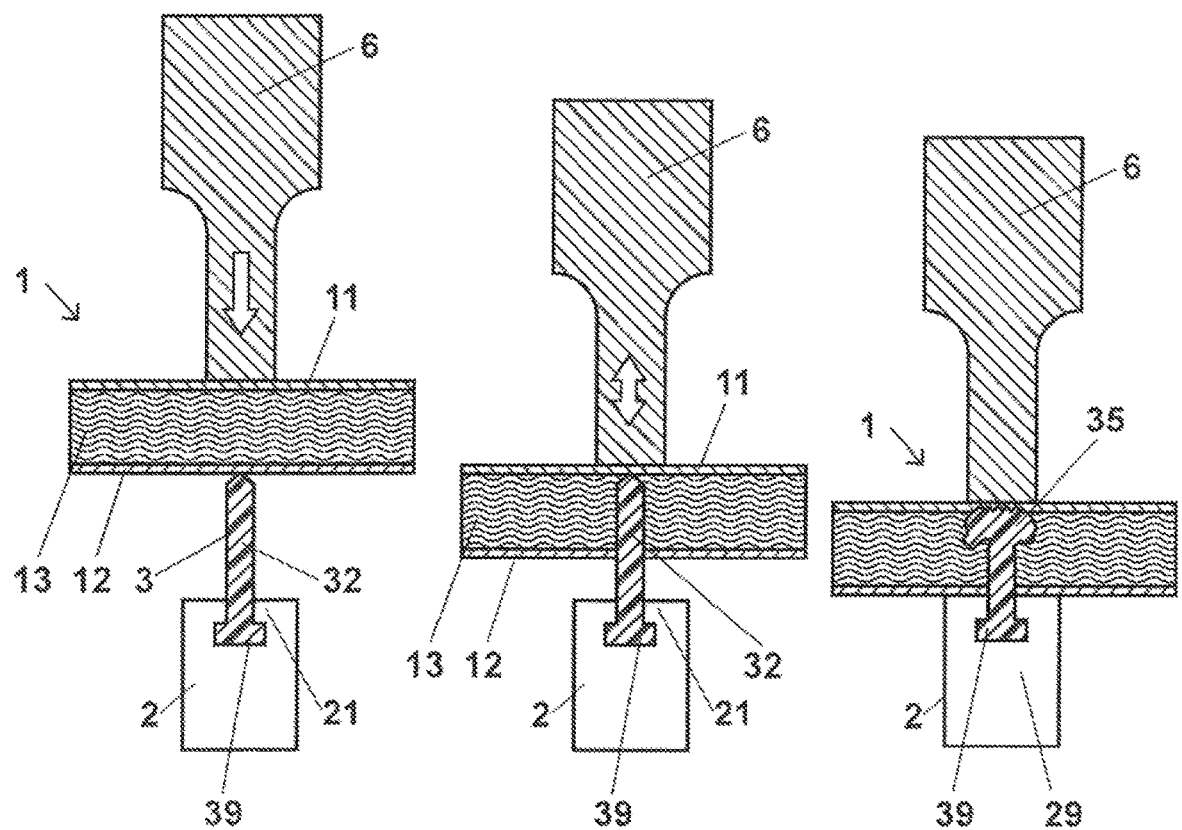
FIG. 3 a configuration of a first object, a second object and a connector during three different stages of a process of securing the second object to the first object by anchoring the connector in the first object, wherein the second object is a metal frame.

FIG. 3 shows a configuration similar to the one of FIG. 2 wherein the second object 2 is a metal frame, with the sheet portion 21 being a portion of the metal frame. The three panels of FIG. 3 show steps of the process, (from left to right), namely a step of positioning the first and second objects 1, 2 and the connector 3 relative to one another, the onset of the mechanical vibrations (i.e. the initial stage of the energy impinging on the connector), and the stage at which the mechanical vibrations and the pressing force are stopped, respectively.

In the left panel of FIG. 3, the second building layer 12 is illustrated without an opening. As mentioned, depending on the layer's material properties, it is an option to not pre-manufacture the opening but to manufacture it by pressing a tip or other penetrating (cutting/piercing) feature of the connector into it. In accordance with an alternative working for almost all first building layer material compositions, however, the opening may be pre-made.

In the shown embodiment, further the foot portion 39 of the connector is shown to be distally supported (support portion 39) and laterally guided by the second object. A distal support and/or a guidance by the second object is an option for other embodiments of the invention, too. Due to the distal support by the second object, the counter force acting against the pressing force exerted by the sonotrode 6 may act on the second object, i.e. the second object may be pressed against the first object for being secured thereto, while the mechanical energy impinges on the latter from the sonotrode.

The left panel of FIG. 3 illustrates how the flow portion 35 may form a head that in addition to being anchored in the structures of the first building layer (including, if applicable, an adhesive or similar), also provides for some kind of rivet effect, especially if the interlining 13 exhibits some substantial dimensional stability.

Figure 4:
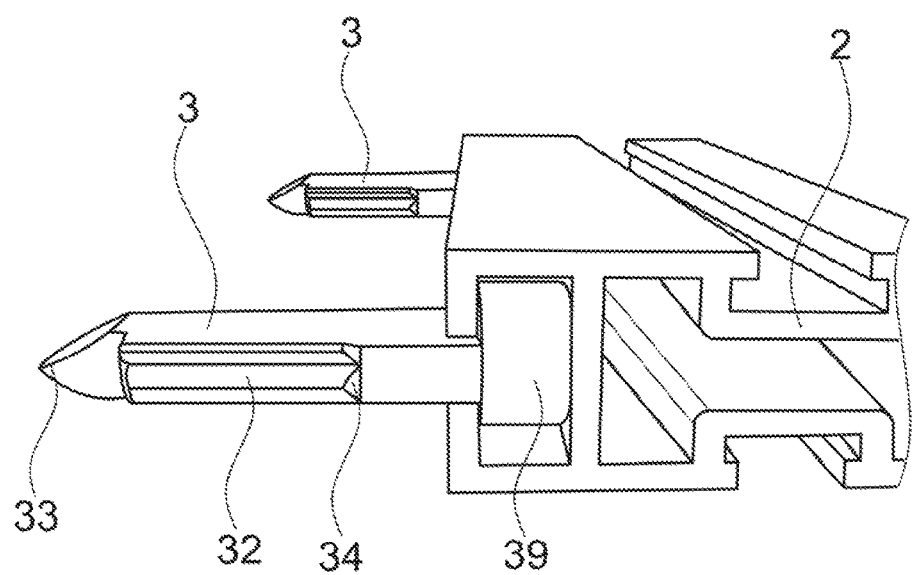
FIG. 4 an image of a second object to which connectors are attached.

FIG. 4 shows an image of a metal profile 2 being an example of a second object holding two connectors. One can also see a step feature 34 that is located so as to be in contact with the mouth of the opening in the second building layer when the proximal end of the shaft portion abuts against the first building layer 11. By this, additional anchoring in the second building layer may be achieved.

Figure 5:
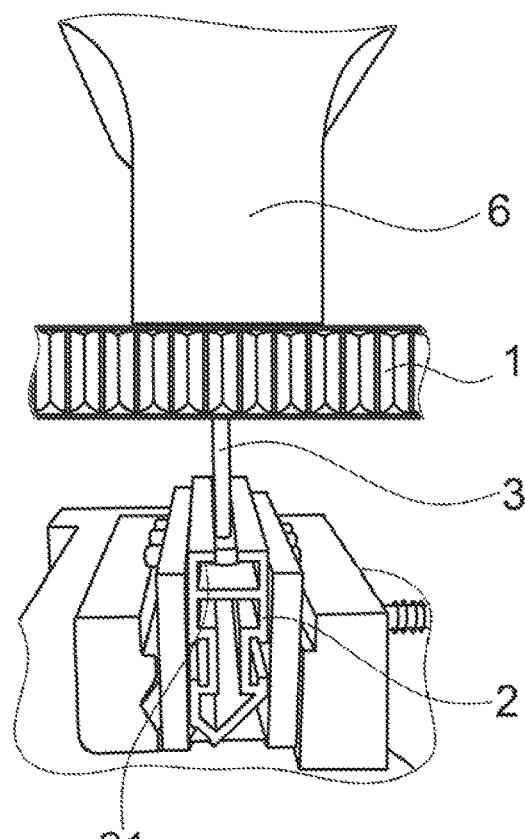
FIGS. 5 and 6 different steps of a test carried out with the arrangement of FIG. 4.
Figure 6:
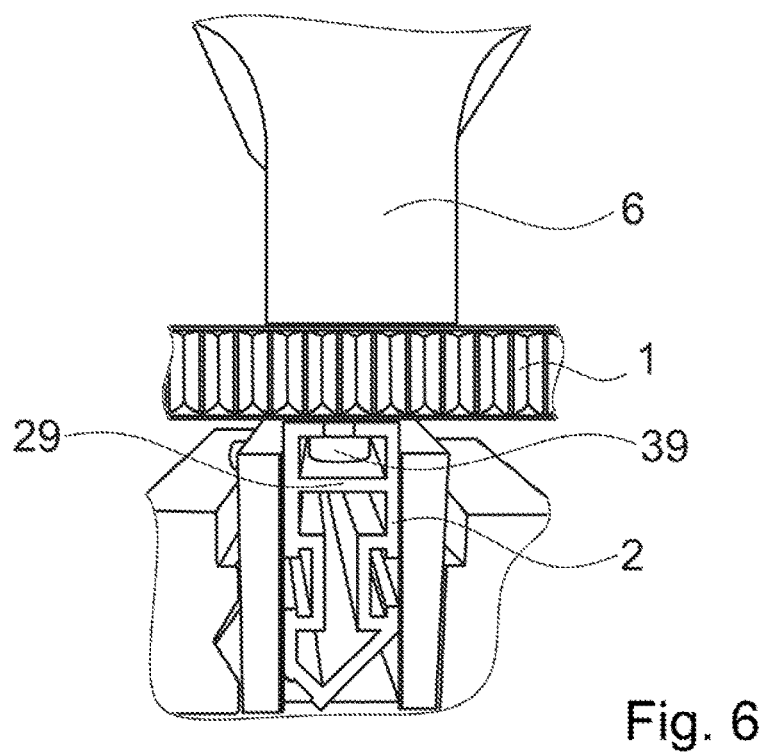

FIGS. 5 and 6 depict the configuration of FIG. 4 together with a first object 1 being a sandwich board with a cardboard honeycomb structure interlining and a sonotrode having a size and shape suitable for carrying out the anchoring process simultaneously for both connectors. FIG. 5 shows the situation at the onset of the process, and FIG. 6 at its end.

Figure 7:
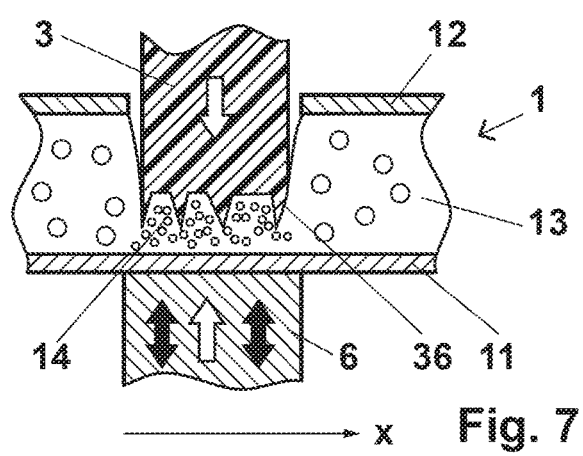
FIG. 7 an alternative configuration with a compressible interlining material.

FIG. 7 shows an example of an embodiment in which the first object 1 has a first building layer 11, an optional second building layer 12, and a foam material interlayer 13. Compared to the previous figures, FIG. 7 shows the arrangement in an upside down orientation.

Figure 8:
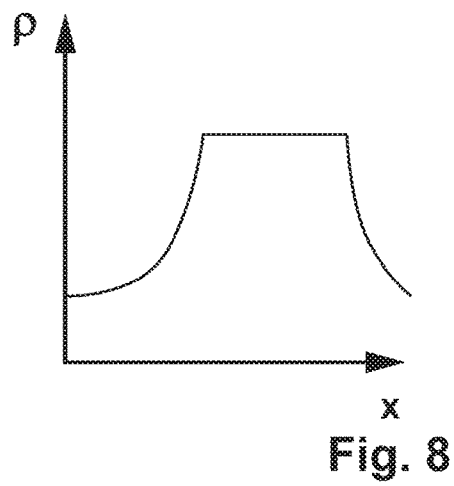
FIG. 8 a density distribution for the configuration of FIG. 7.

The embodiment of FIG. 7 uses the compression of the foam material of the foam interlayer 13 (serving as interlining) for improved anchoring. After removal or piercing of a portion of the distal building layer 12, the connector 3 is advanced into the foam material, resulting in a compression of the portions between the connector 3 and the building layer 11 (compressed portion 14). The density profile as a function of the lateral position will as a consequence be as illustrated in FIG. 8 showing the density p as a function of the lateral position x (see FIG. 7).

The compression of foam material has a multiple effect on the process:
Firstly, since the foam material is compressed, the distance between the sonotrode 6 and the proximal end of the connector 3 is reduced, hence reducing the distance through which the mechanical energy has to be transported.
Secondly, the increased density contributes to an increased capability of vibration transmission through the material.
Thirdly, due to the compression, the mechanical resistance against a forward movement of the connector towards the proximal direction gradually increases, and this in turn increases the potential energy absorption at the interface to the interlayer 13.
Fourthly, the increased density brings about additional stiffness and stability, so that the thermoplastic material after liquefaction and re-solidification is anchored in material portions that are mechanically relatively stable, compared to non-compressed portions of the interlayer.

In the embodiment of FIG. 7, the connector 3 is illustrated to essentially have a bolt shape and to include a plurality of energy directors 36. However, the concept of the compression of material to locally increase its density, wherein the connector is anchored in the compressed material portion is applicable independently of the shape of the connector.

The following may be varied deviating from the depicted configuration:
The second(distal) building layer 12 could be omitted, i.e. the embodiment also works for first object without the second building layer.
The first(proximal) building layer 11 could be omitted, i.e. the foam layer 13 then is in direct contact with the sonotrode 6, or with a temporal intermediate element that is removed after the process. This works provided the foam material at least when compressed has sufficient stiffness for the mechanical vibration energy to propagate.
A combination of both, i.e. the first object may then even consist of a foam element 13.

Figure 9A:
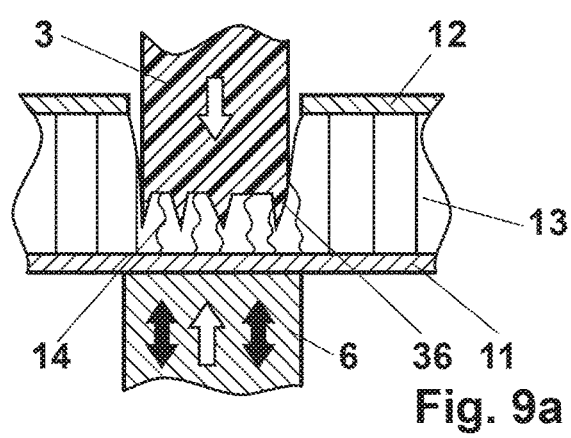
FIGS. 9a and 9b yet another configuration during two different stages of the method.
Figure 9B:
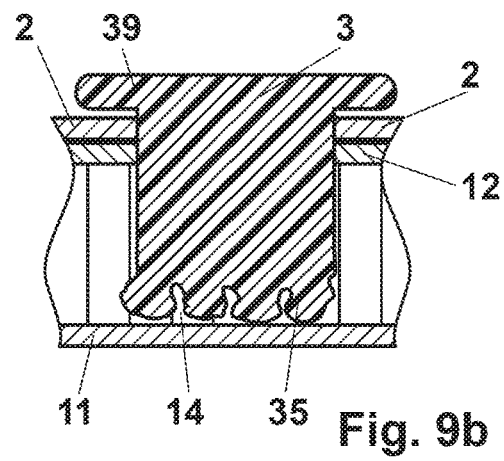

FIG. 9*a* illustrates the concept of compression for the example of a lightweight building material interlining layer 13 with comparably large gaps, for example a honeycomb interlayer. The compressed portion 14 is constituted by deformed and/or displaced parts of the interlining layer, such as deformed and/or displaced cardboard or plastic sheets that previously have constituted the honeycomb structure. After the process (FIG. 9*b*), at least parts of the flow portion 35 after re-solidification are anchored in the compressed portion 14 constituted by the deformed and/or displaced parts. Another feature of the embodiment of FIG. 9*b*, which feature is independent of the approach of compressing interlining material, is that the connector 3 has a foot portion 39 and serves for attaching a second object 2, for example an object having a metal sheet portion, to the first object 1. To this end, the second object 2 has a through opening through which the connector reaches, with the foot portion 39 distally of the portion of the second object that has the through opening, and with a proximally facing surface portion of the head portion abutting against the second object around the opening, whereby the second object is restricted (for example clamped) between the distally facing surface of the first object and this surface portion.

This other feature is realizable for any embodiment described in this text. As an alternative or in addition thereto, to connecting a second object in this manner, the connector may include an alternative attachment structure, such as a thread, a structure for a bayonet connection, a clip-on structure, an attachments surface for gluing a second object thereto, etc., or it may directly carry or have integrated such second object (for example if the second object is smaller than the connector itself, for example if the second object is a sensor, a cable, etc.), or it may be one-piece with a functional part of the second object, for example by being a foot of the second object, etc.

Figure 9C:
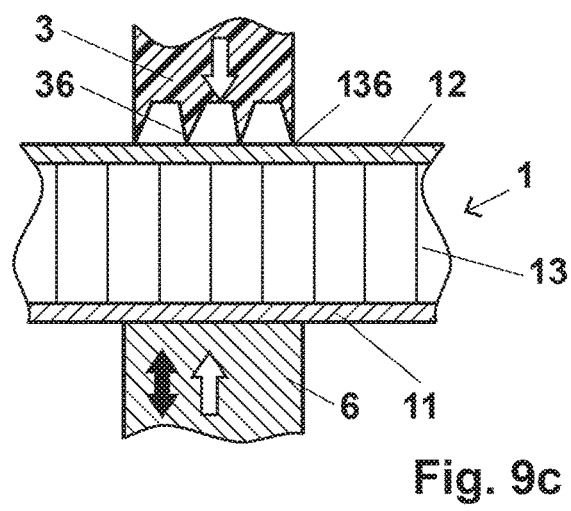
FIG. 9c a variant thereof.

In the embodiments of FIGS. 7 and 9a, the first object is illustrated to have an initial, distal opening, i.e. the second building layer 12 is locally removed to provide an access for the connector. This is not a requirement. Rather, the connector may, depending on the structure of the first object, be directly pressed into the (initially intact) distal surface of the first object, as for example illustrated in FIG. 3 and for example FIGS. 10a/10b or FIGS. 15a/15b hereinafter. This is even an option if the first object is a sandwich board and if the connector does not have a single proximal tip but a larger proximal footprint. FIG. 9c illustrates an according example in which a peripheral ridge forms a punching and energy directing feature 136. Initially, when the pressing force is applied (optionally together with mechanical vibration not sufficient for the peripheral ridge to liquefy) a portion of the second building layer is punched out, whereafter the process as shown in FIGS. 7 and 9a/9b may take place (the concept of FIG. 9c applies independent of the interlining layer composition), with the punched-out portion being displaced to proximally. Because of this, especially because of the punched-out portion remaining in the first object, this variant of the process may lead to less anchoring at the proximal end of the connector and less connection with the first building layer 11 but to a more pronounced sideward/lateral flow of the thermoplastic portion, and hence to flow proximally of the second building layer 12 and hence a more pronounced anchoring relative to the second building layer 12.

Figure 10A:
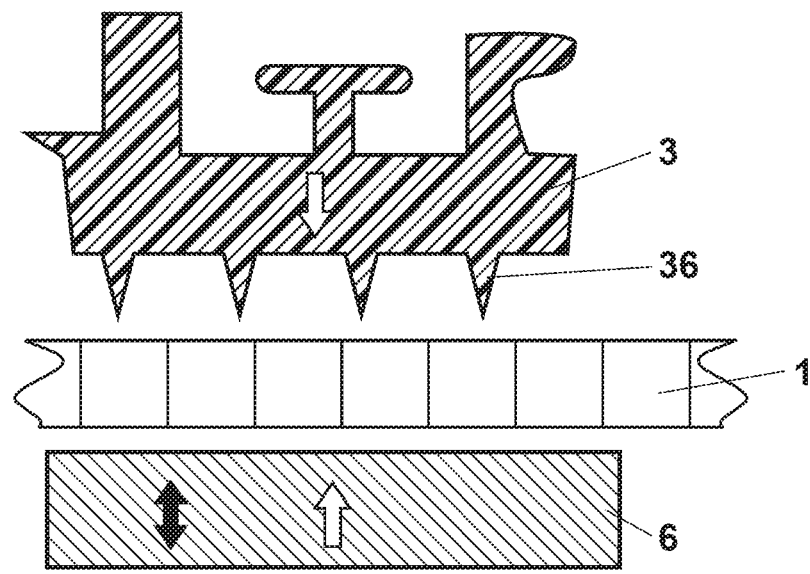
FIGS. 10a and 10b anchoring a connector with an arbitrary shape and a device with an arbitrary shape and a plurality of connectors, respectively, by the method.

As illustrated very schematically in FIG. 10a, one of the advantages of the approach according to the present invention is that the connector 3 may have any shape. Especially, due to the approach according to the invention, the connector does not need to have a shape particularly that allows a vibration tool to couple mechanical vibration into the connector (no coupling-in surface portion needed). Rather, the surface facing away from the first object may have any complicated shape, including a shape forming undercuts, as long as it is somehow possible to apply a pressing force directed towards the first object (which is much less of a restriction than if mechanical vibration needs to be coupled directly into the object).

A sonotrode 6, as described above, is shaped to apply mechanical vibration to the other (proximal) side of the first object, and to this end may for example have an essentially plane distally facing coupling surface, as illustrated in FIG. 10a.

Figure 10B:
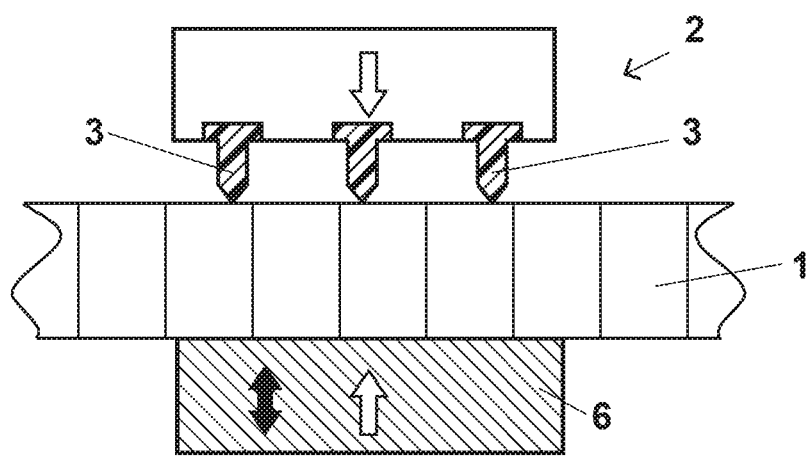

As shown in FIG. 10b, the same considerations for FIG. 10a apply if a second object 2 to be connected to the first object is provided with a plurality of pre-assembled (or in-situ-assembled) connectors 3 that are simultaneously anchored by applying the pressing force to the second object and hence indirectly to the connectors 3. Also in this, the second object may have any shape that allows to somehow apply a pressing force.

A further general advantage of the approach according to the invention becomes evident from FIG. 10b: In contrast to, for example, ultrasonic welding methods, the second object itself is not loaded by mechanical vibration even if it is pre-assembled with the connector(s) but only with the pressing force. Hence, it is possible to pre-assemble or in-situ-assemble even delicate second objects with the connector(s), which delicate objects would not be suitable to sustain the mechanical vibrations present during the process.

The approach according to the invention also works if the first object is a lightweight building object that has essentially no interlining (i.e. consists of two spaced building layers 11, 12 only separated by discrete distance holders) or has an interlining layer of very low density, and even if the material of the building layers is too dense for thermoplastic material to penetrate into it. As illustrated in FIGS. 11a and 11b, the structures of the first object 1 into which the flow portion 35 flows to result in a positive-fit connection are hollow spaces between the building layer, whereby the positive-fit connection between the first object and the connector 3 is a blind-rivet-like connection.

In the above-described embodiments, the following holds:
The proximal end face of the first object that is in contact with the sonotrode 6 remains intact;
That thermoplastic flow portion does not reach this proximal end face of the first object that is in contact with the sonotrode; does not get into contact with the sonotrode; and/or
The flow of the flow portion is confined by a proximal layer (such as the first building layer 11) of the first object.

As shown in FIGS. 12a and 12b, there are alternative embodiments in which neither of these conditions is fulfilled: More in particular, in the embodiment of FIGS. 12a and 12b the connector includes a piercing portion 37 that causes the first building layer 11 to become pierced. In addition or as an alternative, the first building layer may be pierced by another means. For example, when an opening is made into the first object from the distal side, the tool (drill or the like) by which this opening is made also pierces the first building layer, however, generally with a much smaller diameter than the opening in the second building layer 12 and the shaft of the connector 3.

In the embodiment of FIGS. 12a and 12b, the sonotrode 6 includes a cavity 61 facing the first object 1, wherein portions of the flow portion 65 that penetrate through the opening of the first building layer may spread in the cavity 61. Especially, the cavity may have a lateral extension in at least one in-plane direction which lateral extension exceeds the extension of the opening, whereby the thermoplastic material that has flown through the opening may, after re-solidification, form a head portion that secures the connector against forces into a distal direction in a positive-fit manner. In an example, the process may be carried out until the cavity 61 is filled by the thermoplastic material, whereby the cavity serves as a mold for the thermoplastic material.

In FIG. 13, yet a further principle is illustrated. Namely, the proximal end face of the first object 1, which is not necessarily penetrated by the thermoplastic material as shown in FIG. 12b, includes a marking unambiguously showing where the connector is located underneath the end face. This may have advantages when a further object, such as a screw or a pin or a dowel, is in a later processing step inserted from the proximal side so as to be anchored. Such further object may, depending on the situation, be advantageously anchored in material of the connector, whereby the connector may serve as anchor—especially if the material of the first object itself is not sufficiently stable for a solid anchoring of such further object.

In the embodiment of FIG. 13, a marking is made by a deformation of the first object caused where the connector is anchored. In the illustrated embodiment, the sonotrode 6 is again provided with a cavity that allows for an outward bulge of the first object, which first object may for example include a plastically and/or elastically deformable material.

More in general, and independent of whether a marking is made by the anchoring of the connector, as in FIG. 13, or a separate marking is made, or no marking is made, the first object may be provided with a plurality of connectors located at different lateral positions, for example in a pattern of positions or at defined positions corresponding to a particular requirement. This is very schematically illustrated in FIG. 14 showing a first object with a pattern of attachment locations 91 for attaching a further object from the proximal side and/or from the distal side, with each attachment location 91 constituted by an anchored connector. The centers 92 of the attachment locations may be well-defined whereas the exact lateral extension may depend on the flow of the flow portion and therefore in embodiments may be not precisely defined.

FIGS. 15a and 15b show an even further embodiment in which the connector 3 has a function similar to a punch rivet. In this, bonding the connector 3 to the first object generally includes the steps of:
  providing the first object and the connector, the connector being separate from the first object, the connector extending between a proximal end and a distal end and including a connector body 5, the connector body forming a distally facing punching edge, wherein at least one of the connector and of the first object includes a thermoplastic material 4 in a solid state,
  Placing the connector 3 relative to the first object so that the distal end is in physical contact with a distally facing surface of the first object 1;
  Driving the connector into material of the first object 1 and coupling mechanical vibration into the first object from a proximal side thereof, until the connector extends through a portion of the first object from a distal side to a proximal side thereof and material of the first object is punched out by the connector body, and until at least a flow portion 35 of the thermoplastic material 4 becomes flowable and flows relative to the connector and the first object while the connector body remains solid, and
  Causing the flow portion of the thermoplastic material to re-solidify.

Especially, the method may include the further step of deforming the connector body to be expanded distally of the portion of the first object to anchor the connector in the first object, as shown in FIG. 15b. To this end, the sonotrode 6 may be provided with an according riveting die structure (shaping portion 62), such as a structure known from abutments for prior art punch riveting.

The first object 1 may, for example, be of a fiber composite material.

The method may further include, as illustrated in FIG. 15a, positioning a second object relative to the first object 2 relative to the first object, wherein in the step of being driven into material of the first object 1, the connector 3 is also driven into or through the second object 2 or an opening therein to connect the first and second objects to each other.

Especially, as illustrated in FIG. 15a, the second object may be place proximally of the first object.

The second object 2 in such configurations may be of a fiber composite material or may be metallic.

The connector body 5 may be driven into material of the second object and at the same time deformed to yield a punch rivet foot embedded in material of the second object 2, as shown in FIG. 15a, or even proximally of it (in the terminology of the present application the direction from which the vibrations apply is the proximal direction, hence in FIG. 15b the "foot" is a proximal foot). In the latter case, the method step of driving (optionally, simultaneously with the applying of vibration) may be carried out until the connector is driven through the second object and may punch out a portion of the second object.

In contrast to the latter option, in the embodiment of FIGS. 15a/15b the material pairing of the connector body 5 and the second object 2 and the shape of the shaping portion 62 are chosen such that the connector body does not punch through the second object but merely deforms it and forms a proximal connector foot within the second object material (FIG. 15b). This may achieved, for example, by choosing a ductile material for the second object, such as a suitable steel or aluminum alloy, providing the shaping portion 62 with a comparably smooth surface, and optimizing the material strength of the connector body so that the first object material is punched through but that deformation is possible within the second object 2.

In the illustrated embodiment, as an optional feature, the connector body 5 has a countersunk head portion and in the process is optionally pushed into the assembly of the first and second objects as far as its proximal end face is flush with the distal surface of the first object 1 (FIG. 15b). This feature may especially be advantageous if the connector has the sole function of connecting the first and second objects together, as a kind of modified punch rivet.

The approach according to these "punch rivet" embodiments of the present invention has the advantage of providing a process that is quick and low-cost by providing a connector that has essentially the function of a punch rivet. Mechanically deformable connectors, especially plastically deformed metal rivets, including punch rivets, have been known in the art for a very long time. However, due to the combination of a, for example, metallic (or ceramic or hard plastic or glass etc.) body with the approach of liquefying the thermoplastic material and causing it to re-solidify, the advantages of the material properties of the non-liquefiable material, such as high shear force resistance, high ductility, or also, depending on the application, other properties like electrical conductivity etc. may be used. Nevertheless the disadvantages of prior art punch rivets are avoided. Not only may the thermoplastic material provide a shield against contacts that may bring about corrosion. The thermoplastic material that has flown and re-solidified also has the potential of preventing or curing possible delamination effects. Also, the thermoplastic material may contribute to avoiding adverse effects like the spring back effect.

It has further been observed that punching assisted by ultrasound has the effect of reducing delamination and reducing the extent of a damage zone around the punching location.

Even further, using the thermoplastic material may have one or a combination of the following effects:
  low force, no overpressing, and with that no bulging effect of the sheet material in between different connectors,
  minimal residual stresses reducing the risk for stress induced enhanced aging and corrosion cracking, especially if it is used in combination with a glue at the overlapping sheet material faces, compensating for tolerances, e.g. if the second object has through holes, if the Thermoplastic component of the connector has a glass transition temperature below 160° C. it may also be able to compensate for thermal stresses during the Electrophoretic Deposition (EPD) process in automotive applications.

An example of the second aspect of the invention is shown in FIG. 16. In this, the connector 3 does not have any thermoplastic material but the first object 1 has. The connector 3 instead has structures 131, especially undercut structures 131, that are capable of being flown into by the thermoplastic material to yield a positive-fit connection.

More in particular, in the embodiment illustrated in FIG. 16, the first object in addition to the first building layer 11, the second building layer 12, and the interlining 13 the first object 1 has a thermoplastic layer 16, for example distally of the first building layer. When during the process the proximal end of the connector 3 is pressed towards the thermoplastic layer 16 and the first building layer 11, a flow portion of the thermoplastic material of the thermoplastic layer becomes flowable and penetrates into to the structures 131 to yield, after re-solidification, a positive-fit anchoring of the connector.

Instead of having a separate, dedicated thermoplastic layer, or in addition thereto, the first object 1 may have thermoplastic material in an other form, for example if the first building layer, the interlining and/or an adhesive layer bonding the interlining to the first building layer has thermoplastic properties.

In addition or as an alternative to having structures 131 with an undercut at the proximal end, as shown in FIG. 16, the connector in embodiments of the second aspect may have any other structures, for example lateral structures (such as a sequence indentations), a macroscopic porosity, etc.

FIG. 17 shows a process diagram of a process according to the first or second aspect of the invention. 101 shows the force applied onto the connector as a function of the time t, and 102 denotes the vibration energy input (energy per time, i.e. power P).

In the illustrated embodiment, the force as a function of time is assumed to have a first peak when the connector penetrates into the first object 1, for example, if applicable, when it has to penetrate into the first building layer. Depending on the configuration (structure of the first object; possible presence and size of a pre-made distal opening, etc.), such first peak may be present or not and if present may have different characteristics. At some stage, the proximal and of the connector will encounter additional resistance (second peak 105) because it abuts against the first building layer (for example, in configurations like in FIGS. 1-3 and/or because the resistance of the material against which it is pressed rises gradually. The apparatus for carrying out the method may be configured to start the mechanical vibration energy input only when the force is sufficiently high, for example after the force has reached a triggering level $F_t$.

In this, in most embodiments, the force is the force on the connector (applied by an appropriate pressing tool) and not the force on the vibration generating tool. In contrast to prior art processes, the device by which the force used to control the energy input and the device that applies the vibration energy are separate/different devices (but may of course belong to a same apparatus).

If the first peak 104 (if present) may be expected to be rather high, for example higher than the triggering force $F_t$, then the position of the tool that advances the connector may be an additional parameter used for control, i.e. the apparatus may be programmed to apply the vibration only if this device has advance towards the proximal direction to at least a pre-defined position and the force exceeds the triggering force. This may, for example, especially be the case if the second building layer 12 is pierced by the connector after being brought into contact with the distally facing surface of the first object. Thus, in accordance with this option, as a function of the axial position z there may be a piercing window (mechanical intrusion window) where in embodiments no vibrations act even if the force is above a triggering level, and a sensing window for the trigger where the vibrations set in as soon as the force is above the trigger force.

As an other alternative, the control may be such that the vibration input depends on the position only (position dependent control). In either case, parameters of the tool that applies the pressing force and not the vibration tool are used to control the process. However, optionally the feedback by the vibration generating apparatus may be used as an additional input for the process control.

Figure 18:
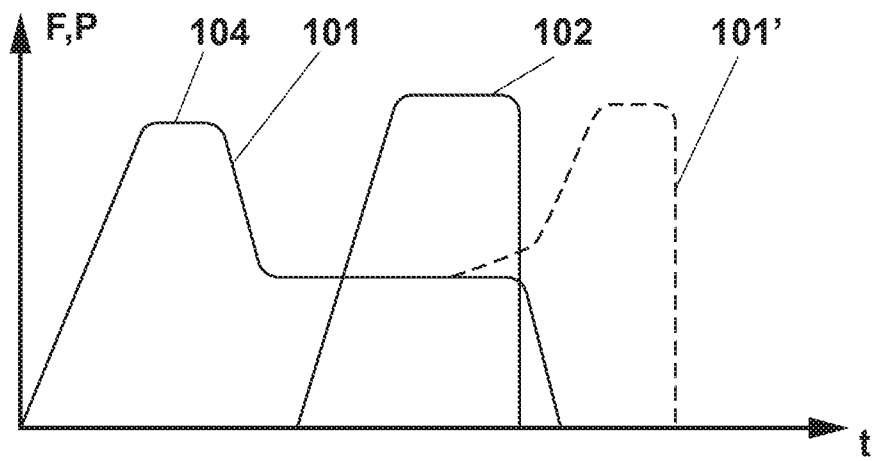

FIG. 18 shows an example in which the force during the step of applying the mechanical vibration is not particularly high (for example, due to a certain structure of the first object and/or because after an initial energy input the connector becomes soft rather quickly and/or because the connector material has a low modulus of elasticity). Then, the force (force curve 101) is not a suitable parameter for process control, and instead the position may be used.

The position may especially be a suitable parameter of the process if the force generating device of the apparatus is appropriately controllable, such as by being based on stepper motors or well-controlled hydraulics instead of for example pneumatics.

Another optional feature of embodiments of the invention (independent of which parameter is used to control the process) is illustrated in FIG. 18. Namely, as explained above, a holding force may be maintained after the vibrations have stopped. This holding force may according to an option even be higher than the force applied during the energy input, as illustrated by the dashed line 101' showing a pressing force that rises after the mechanical vibrations have stopped, for example for forming an even more pronounced head portion by the flow portion of the thermoplastic material. Of course, other pressure-time curves are possible, including keeping the pressing force constant for some time during switch-off and after the vibrations have stopped.

Figure 19A:
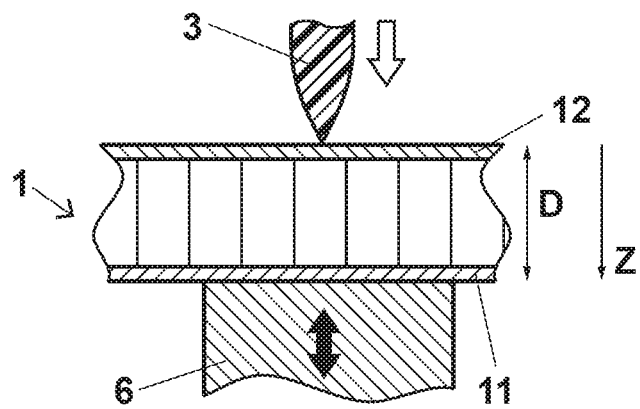
FIGS. 19a and 19b an illustration of the principle of the position dependence of the efficiency of energy absorption.
Figure 19B:
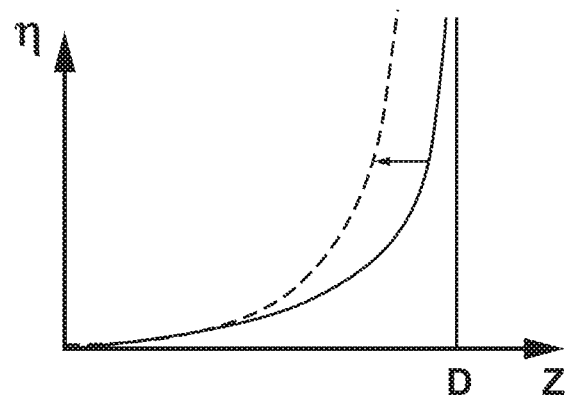

Depending on the structure and material(s) of the first object, the efficiency of the energy transfer through the first object to the thermoplastic material of the connector 3 may strongly depend on how far the connector has advanced towards the proximal direction, i.e. how close the proximal end of the connector is to the sonotrode 6. FIG. 19a very schematically depicts the situation in which the first object has a thickness D and the connector initially has to pierce the second building layer (leading to a first peak as schematically illustrated in FIGS. 17 and 18). FIG. 19b schematically shows the energy transfer efficiency η as a function of the position z of the proximal-most portion of the connector. Especially if first object has an interlining layer and the interlining layer is comparably weak, the efficiency will be rather low unless the proximal-most portion of the connector is close to the sonotrode, because such interlining layer (or other low density and/or low stiffness material) is a weak transmitter of mechanical vibration energy. The efficiency curve may shift as a function of time (transition from the solid line to the dotted line in FIG. 19b), for example if the connector material is heated to be above the glass transition temperature, whereupon it becomes an efficient absorber of vibration energy due to enhanced internal friction. Thus the process parameters may also depend on the velocity of the movement of the connector into the first object.

Due to the, in certain setups, strong dependence of the efficiency on the position, in force controlled processes it may be unnecessary to foresee a mechanical intrusion window as described above, because during the piercing step the energy transfer to the connector may be so weak that it does not matter whether the mechanical vibrations act during this step or not.

Figure 20:
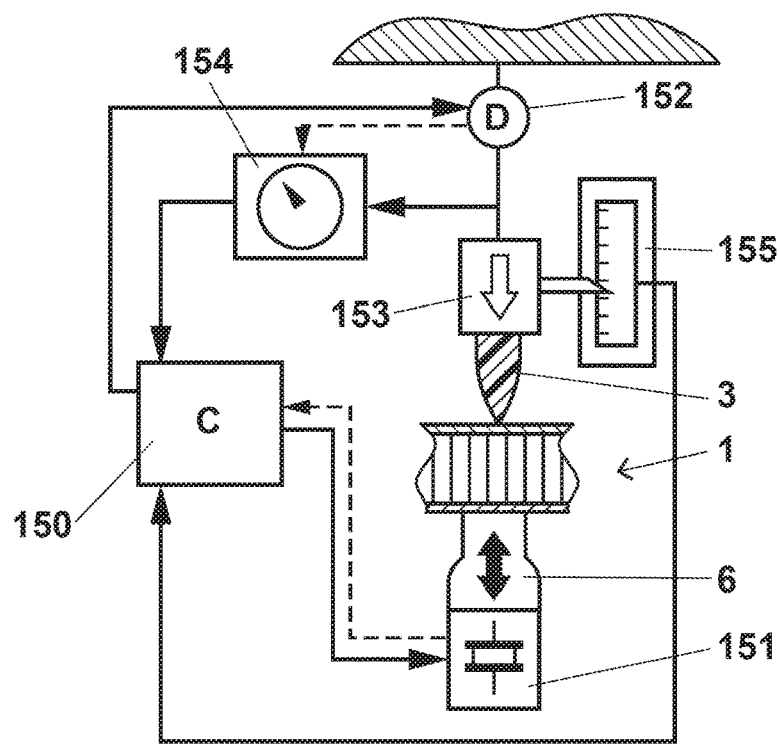
FIG. 20 a scheme of an apparatus for carrying out embodiments of the method.

FIG. 20 shows an embodiment of an apparatus for carrying out the method according to the different aspects of the invention. A control unit 150 controls a transducer unit 151 that sets the sonotrode 6 into oscillation as well as a driving mechanism 152 that advances a tool 153 for pressing the connector 3 towards a proximal direction (in the depicted configuration into the first object 1). The driving mechanism may be an electrical driving mechanism, for example, with a well-defined controllable movement relative to a load frame, such as a driving mechanism with a synchronous motor. Alternatively, the driving mechanism may be based on a hydraulic drive (which also has the advantage of an essentially defined position/advance movement) or a pneumatic drive (with a well-defined driving force) or an other suitable driving mechanism. Also combinations of the mentioned mechanisms are possible.

The sonotrode and the transducer unit in this do not need to be provided with a driving mechanism for being advanced but may be mounted stationary, for example relative to a working frame (for example working table). However, such (additional) sonotrode driving mechanism is not excluded.

The control unit 150 controls the process, as described above, based on:

the force and/or pressure exerted by the tool 153; and/or
the position of the tool and/or a the connector.

To this end, the apparatus may include a force/pressure measuring stage 154 that measures the force by the tool (force and pressure are, given a well-defined geometry, equivalent, and in this text generally often only the term 'force' is used; of course the skilled person will know the equivalence between force and pressure). Such force measuring stage 154 may be constituted by a dedicated measuring probe, or in addition or as an alternative by a control signal and/or feedback signal of the driving mechanism 152 itself.

In addition or as an alternative to the force measuring stage 154, the apparatus may include a position measuring stage 155. Also the position measuring stage 155 may be constituted by a dedicated measuring probe, for example making an optical measurement or a capacitive measurement etc. (different mechanisms for this are known in the art). Additionally or alternatively, the position measuring stage may include using a control signal and/or a feedback signal of the driving mechanism (for example if the driving mechanism includes a stepper motor, the evaluation of the number of steps, etc.).

Figure 21:
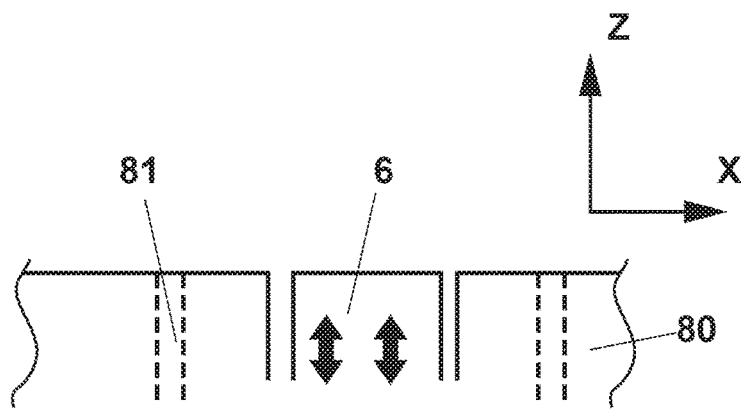
FIG. 21 a working bench of an apparatus.
Figure 22:
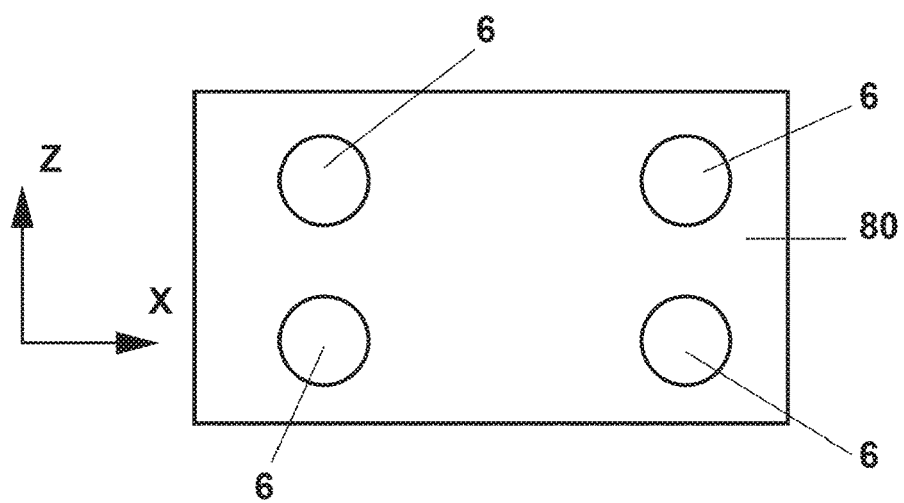
FIG. 22 a top view of a working bench with multiple sonotrodes.

Referring to FIGS. 21 and 22 yet an other possible property of an embodiment of an apparatus for carrying the method is shown. As for example illustrated referring to FIG. 20 in contrast to prior art methods, for example ultrasonic welding methods, the sonotrode during the process in the approach according to principles of the present invention does not need to make a forward movement. This may be used to configure the apparatus as a for example generic, working-table like apparatus with the sonotrode or a plurality of sonotrodes (FIG. 21) being located at a defined location or defined locations, respectively, on a bench 80, which bench serves as an abutment surface for the proximal surface of the first object. A pressing tool may be used to press the connector into the first object at the lateral (x-y) location/locations of the sonotrode(s). The apparatus as a whole or a bench portion of it may be essentially flat and table-like (for first objects with a board shaped portion), with the sonotrode/sonotrodes protruding during the process at most by about an amplitude of the mechanical vibrations.

Optionally, the bench may include means for stabilizing the first object on it, such as suction channels 81 creating a vacuum at the surface when the first object abuts against it.

What is claimed is:

1. A method of anchoring a connector in a first object, the connector comprising a thermoplastic material in a solid state, the method comprising providing the first object and the connector;
bringing the connector into contact with the first object from a distal side thereof;
causing mechanical vibration energy to impinge on the first object from a proximal end face thereof, the proximal end face being opposite the distal side, while the object and the connector are pressed against each other, until a proximally facing portion of the connector is at least partially flowable forming a flow portion of the thermoplastic material, and causing the flow portion to flow into structures of the first object, while no liquefaction of the thermoplastic material occurs at a distal portion of the connector; and
letting the flow portion re-solidify to cause a positive-fit connection between the first object and the connector.

2. The method according to claim 1, comprising causing a proximal end face of the first object to remain intact by the connector being stopped distally of this end face.

3. The method according to claim 1, comprising providing a proximal end face of the first object with an opening, and causing portions of the flow portion to flow through the opening.

4. The method according to claim 1, wherein the first object is a sandwich board comprising a first, proximal building layer, a second, distal building layer and an interlining between the first and second building layers, wherein in the steps of bringing into contact and of causing energy to impinge the connector is caused to go through the second building layer and the interlining but to be stopped by the first building layer, wherein a proximally facing portion of the connector comprises a proximal end of the connector pressed against a distal surface of the first building layer, and wherein the flow portion at least in part flows along the distal surface of the first building layer.

5. The method according to claim 1, wherein during the step of causing mechanical vibration energy to impinge on the first object, the connector protrudes into an opening in a distal face of the first object.

6. The method according to claim 5, wherein providing the first object comprises providing the first object with the opening.

7. The method according to claim 5, comprising pressing the connector into the distal face of the first object to manufacture the opening, wherein said step of manufacturing the opening by pressing is carried out prior to the step of causing mechanical vibration energy to impinge and/or during the step of causing mechanical vibration energy to impinge.

8. The method according to claim 7, wherein the connector comprises a proximal piercing or cutting shape, such as a tip or edge.

9. The method according to claim 1, wherein the connector comprises a distal foot.

10. The method according to claim 1, and comprising securing a second object to the first object by the connector.

11. The method according to claim 10, wherein the second object comprises a sheet portion that after anchoring lies against a distal attachment face of the first object.

12. The method according to claim 11, wherein the sheet portion is clamped between the attachment face and a proximally facing abutment face of a foot portion of the connector.

13. The method according to claim 10, wherein the second object comprises a metal profile.

14. The method according to claim 10, wherein the second object comprises a support portion distally of the connector or distally of a feature of the connector, and wherein a counter force to the force by which the object is pressed against the connector, is applied to the second object.

15. The method according to claim 10, comprising carrying out the step of bringing the connector into contact with the first object for a plurality of connectors simultaneously.

16. The method according to claim 10, comprising carrying out the step of causing mechanical vibration energy to impinge on the first object while the object and the connector are pressed against each other for a plurality of connectors simultaneously.

17. The method according to claim 15, wherein the connectors are held by a common second object, and wherein a counter force to the force by which the object is pressed against the connector, is applied to the second object.

18. The method according to claim 1, comprising the step of deforming and/or displacing material of the first object in the first object.

19. The method according to claim 18, wherein the step of deforming and/or displacing material of the first object is caused before portions of the connector are flowable.

20. The method according to claim 18, wherein the step of deforming and/or displacing material of the first object is caused by the connector.

21. The method according to claim 18, wherein in the step of causing the mechanical vibration to act until a portion of the connector is at least partially flowable, the structures into which the flow portion flows include structures of deformed and/or displaced portions of the first object.

22. The method according to claim 21, wherein the deformed and/or displaced portions constitute a region of enhanced density compared to the state prior to deforming and/or displacing, wherein the flow portion flows into structures of this region of enhanced density.

23. The method according to claim 18, wherein the first object is a sandwich board, wherein the deformed and/or displaced portions comprise material of an interlining of the sandwich board.

24. The method according to claim 1, comprising compressing material of the first object yielding compressed material and anchoring the connector in the compressed material and/or in a vicinity thereof.

25. The method according to claim 1, wherein the connector during the process and optionally also thereafter remains accessible from the distal side.

26. The method according to claim 25, wherein the connector during the step of causing energy to impinge is pressed towards a proximal side by a tool that is in physical contact with the connector.

27. The method according to claim 1, comprising the step of anchoring a second object in the first object that comprises the connector from the proximal side after the step of letting the flow portion re-solidify.

28. The method according to claim 1, wherein the connector extends between a proximal end and a distal end and comprises a connector body in addition to the thermoplastic material, the connector body forming a distally facing punching edge, and wherein prior to the step of causing the mechanical vibrations to impinge and/or during this step of causing the mechanical vibrations to impinge, the connector is driven into material of the first object until the connector extends through a portion of the first object from a distal side to a proximal side thereof and material of the first object is punched out by the connector body.

29. The method according to claim 1, wherein the step of causing mechanical vibration energy to impinge on the first object comprises causing a vibrating tool to be lie against the first object, and wherein the vibrating tool during the step of causing mechanical vibration energy to impinge on the first object is stationary.

30. The method according to claim 1, and comprising using a non-vibrating tool to press the connector relative to the first object into a proximal direction.

31. The method according to claim 30, wherein the step of pressing the connector relative to the first object into a proximal direction comprises pressing at least during the step causing the vibration energy to impinge.

32. The method according to claim 31, wherein the step of pressing the connector relative to the first object into a proximal direction comprises pressing also prior to the step of causing the vibration energy to impinge.

33. The method according to claim 31, wherein the step of pressing the connector relative to the first object into a proximal direction comprises pressing also after the step of causing the vibration energy to impinge.

34. The method according to claim 30, and comprising controlling the mechanical vibration energy based on at least one of:
   a position of the non-vibrating tool and/or of the connector;
   a pressing force by which the connector is pressed against the first object.

35. The method according to claim 34, wherein the mechanical vibration energy is switched on only if the pressing force is above a threshold value.

36. The method according to claim 34, wherein the mechanical vibration energy is switched on only if the position of the vibrating tool and/or the connector is within a pre-defined window.

37. An apparatus for anchoring a connector in a first object, the apparatus comprising:
   a vibration generating device coupled to a sonotrode for generating the mechanical vibration;
   a driving mechanism coupled to a tool for moving the connector relative to the sonotrode; and
   a control unit coupled to the vibration generating device and the driving mechanism and equipped to control a movement of the driving mechanism and a vibration generation of the vibration generating device,
   wherein the vibration generating device is mounted to be stationary.

38. The apparatus according to claim 37, further comprising a first sensing means for sensing directly or indirectly a position of the tool and/or the connector, the control unit being coupled to the first sensing means and equipped to obtain a position information based on a signal received from the first sensing means.

39. The apparatus according to claim 38, wherein the first sensing means is equipped to use a feedback and/or control signal of the driving mechanism for sensing indirectly the position.

40. The apparatus according to claim 37, further comprising a second sensing means for sensing directly or indirectly a force exerted by the tool on the connector, the control unit being coupled to the second sensing means and equipped to obtain a pressing force information based on a signal received from the second sensing means.

41. The apparatus according to claim 40, wherein the second sensing means is equipped to use a feedback and/or control signal of the driving mechanism for sensing directly or indirectly the pressing force.

42. The apparatus according to claim 37, wherein the vibration generating device is mounted in a stationary manner relative to a working frame.

43. The apparatus according to claim 37, wherein the sonotrode is arranged so that an outcoupling face against which the proximal face of the first object rests during anchoring faces upward.

44. The apparatus according to claim 37, comprising an abutment surface for the first object to be placed against for anchoring, the sonotrode being integrated in the abutment surface so that an outcoupling face of the sonotrode is approximately flush with the abutment surface.

45. The apparatus according to claim 44, comprising a plurality of sonotrodes integrated in the abutment surface at laterally spaced positions.

46. The apparatus according to claim 45, wherein the abutment surface is constituted by an upward facing working bench.

* * * * *